US009456459B2

United States Patent
Rost et al.

(10) Patent No.: US 9,456,459 B2
(45) Date of Patent: Sep. 27, 2016

(54) METHOD FOR PROVIDING A RANDOM ACCESS CHANNEL IN WIRELESS NETWORK FOR COMMUNICATION AND A CORRESPONDING SYSTEM

(75) Inventors: Peter Rost, Dresden (DE); Andreas Maeder, Wurzburg (DE)

(73) Assignee: NEC CORPORATION, Tokyo (JP)

( * ) Notice: Subject to any disclaimer, the term of this patent is extended or adjusted under 35 U.S.C. 154(b) by 231 days.

(21) Appl. No.: 13/983,097

(22) PCT Filed: Jan. 24, 2012

(86) PCT No.: PCT/EP2012/051042
§ 371 (c)(1),
(2), (4) Date: Aug. 1, 2013

(87) PCT Pub. No.: WO2012/104175
PCT Pub. Date: Aug. 9, 2012

(65) Prior Publication Data
US 2013/0301603 A1  Nov. 14, 2013

(30) Foreign Application Priority Data

Feb. 3, 2011  (EP) .................................... 11000856

(51) Int. Cl.
*H04W 4/00* (2009.01)
*H04W 74/08* (2009.01)
*H04L 5/00* (2006.01)
(Continued)

(52) U.S. Cl.
CPC .......... *H04W 74/085* (2013.01); *H04L 5/0007* (2013.01); *H04L 5/0037* (2013.01); *H04W 74/0833* (2013.01); *H04L 5/0012* (2013.01); *H04L 5/0044* (2013.01); *H04W 48/16* (2013.01); *H04W 72/04* (2013.01)

(58) Field of Classification Search
CPC ......... H04W 74/085; H04W 74/0833; H04W 72/04; H04W 48/16; H04L 5/0007; H04L 5/0037; H04L 5/0044; H04L 5/0012
See application file for complete search history.

(56) References Cited

U.S. PATENT DOCUMENTS 8,031,583 B2 * 10/2011 Classon ................ H04L 1/1822
370/208
8,345,621 B2 * 1/2013 Kwon et al. .................. 370/330
(Continued)

OTHER PUBLICATIONS

Huawei, "Considerations on RAN overload control", 3GPP TSG-RAN WG2 #70, R2-102894, May 3, 2010.
(Continued)

*Primary Examiner* — Phuc Tran
(74) *Attorney, Agent, or Firm* — Young & Thompson (57) ABSTRACT

A method for providing a random access channel in a, preferably OFDMA-based, wireless network for communication includes: a) defining at least one radio frame according to a frame structure of the wireless network for data transmission; b) providing at least one random access channel in the radio frame by at least one base station of the wireless network for random data transmission of at least one user equipment; c) accessing the at least one random access channel by the at least one user equipment for random data transmission; d) determining network information of the, preferably OFDMA-based, wireless network including network user equipment related information of the at least one user equipment; and e) assigning the at least one random access channel according to the determined network information for random data transmission. A corresponding system is also described.

19 Claims, 5 Drawing Sheets (51) Int. Cl.
*H04W 48/16* (2009.01)
*H04W 72/04* (2009.01)

(56) References Cited

U.S. PATENT DOCUMENTS

| | | | | |
|---|---|---|---|---|
| 8,599,706 | B2* | 12/2013 | Damnjanovic et al. | 370/252 |
| 2007/0064669 | A1* | 3/2007 | Classon | H04L 1/1822 370/347 |
| 2010/0080181 | A1* | 4/2010 | Yamada et al. | 370/329 |
| 2010/0157927 | A1* | 6/2010 | Mochizuki et al. | 370/329 |
| 2010/0216479 | A1* | 8/2010 | Kato et al. | 455/450 |
| 2010/0273490 | A1* | 10/2010 | Velde et al. | 455/436 |
| 2010/0309877 | A1* | 12/2010 | Damnjanovic et al. | 370/331 |
| 2011/0039590 | A1* | 2/2011 | Park | H04W 74/0866 455/509 |
| 2011/0194483 | A1* | 8/2011 | Ji | H04W 36/0033 370/315 |

OTHER PUBLICATIONS

Itri, "Further considerations on group paging for MTC", 3GPP TSG-RAN WG2 #71bis, R2-105822, Oct. 5, 2010.

International Search Report dated Jun. 18, 2012, corresponding to PCT/EP2012/051042.

3rd Generation Partnership Project; Technical Specification Group Services and System Aspects; Service Requirements for Machine Type Communications (MTC); Feb. 1, 2011; pp. 1-18; XP002676884.

3rd Generation Partnership Project; Technical Specification Group Services and System Aspects; System Improvements for Machine Type Communications; Jul. 1, 2010; pp. 1-80; XP002676885.

Shao Yu Lien, et al.; "Towards Ubiquitous Massive Accessess in 3GPP Machine to Machine Communications"; Apr. 1, 2011; pp. 66-74; XP002676886.

* cited by examiner

METHOD FOR PROVIDING A RANDOM ACCESS CHANNEL IN WIRELESS NETWORK FOR COMMUNICATION AND A CORRESPONDING SYSTEM

The present invention relates to a method for providing a random access channel in a, preferably OFDMA-based, wireless network for communication comprising the steps of
a) Defining at least one radio frame according to a frame structure of the, preferably OFDMA-based, wireless network for data transmission,
b) Providing at least one random access channel in the radio frame by at least one base station of the based wireless network for random data transmission of at least one user equipment,
c) Accessing the at least one random access channel by the at least one user equipment for random data transmission, The present invention relates also to a system for providing a random access channel in a, preferably OFDMA-based, wireless network for communication, comprising at least one base station assigned to at least one cell of the wireless network, at least one user equipment, located in at least one of the cells of the wireless network, and wherein the at least one base station is formed such to provide at least one random access channel in a radio frame for random data transmission of the at least one user equipment.

Also applicable for arbitrary communication devices the present invention will be described in the following with regard to machine-type communication (MTC) devices.

BACKGROUND OF THE INVENTION

Machine-type communication is a communication between two machines each having a corresponding communication device, for example an air interface, A first machine may for example capture information or data from a second machine. Many machine-type communication devices request a transmission of relatively short messages at regular time intervals. For example a beverage vending machine transmits its fill level of beverages via a wireless communication network in regular intervals to a server of a supplier of beverages. The server then informs or indicates the supplier that the beverage vending machine has to be refilled if the fill level of beverages has decreased below a predefined threshold.

The time intervals between subsequent requests of a transmission are in general too long to use or justify a permanent connection for each machine-type communication device, since the data transmission resources have to be shared with other communication devices and are of course limited. On the other hand the time intervals between subsequent requests are not necessarily deterministic: There may be small or large variations in the time intervals between subsequent requests: For example the beverage vending machine sends its fill level to the server of the beverage supplier every two days. However, if a local event, for example a soccer game takes place, a lot of persons may use the beverage vending machine within a relatively short period so that the fill level is lowered to such an extent that refilling is immediately necessary. The beverage vending machine then may request a transmission for its fill level information from a base station in a wireless network on a much shorter timescale to avoid a critically low amount of beverages.

To provide a suitable communication for such data transmission requests a random access channel for example implemented in the 3GPP long term evolution (LTE) was proposed. A corresponding random access channel named bandwidth request channel (BRCH) in IEEE 802.16e/m was also proposed.

However, network traffic intensity in terms of requests of machine-type communication devices is very large in areas with a high population density and a high penetration rate of machine type communication devices. For example a study estimated up to thirty random access channel requests per second and per cell for data transmission in a cell-based network structure for a typical London urban scenario.

The large amount of requests for random access channels per second leads to capacity problems of existing random access channel specifications. These depend on the probability that two or more machine type communication devices use the same time/frequency resources or resource units and in particular the same preamble or CDMA code at the same time. The capacity is defined by the number of requests per second, which may vary in size under the condition that the collision probability is below a predefined value, for example 1%.

Machine type communication devices also coexist with other mobile devices in typical networks, so the amount of resources units for the random access channel cannot be increased arbitrarily.

Since machine-to-machine applications have highly varying quality of service requirements a collision probability of a transmission request by machine type-communication devices is further increased: In case of high a quality of service requirement a machine-to-machine application has to transmit the data for example immediately resulting in an increase of collisions when the penetration rate of machine type communication devices is also very high.

SUMMARY OF THE INVENTION

It is therefore an objective of the present invention to provide a method and a system for providing a random access channel in a, preferably OFDMA-based, wireless network for communication with a reduced collision probability of transmissions of machine-type communication devices when requesting a transmission via one or more random access channels.

It is a further objective of the present invention to provide a method and a system for providing a random access channel in a, preferably OFDMA-based, wireless network for communication with enhanced flexibility when providing and/or accessing a random access channel.

It is an even further objective of the present invention to provide a method and a system for providing a random access channel in a, preferably OFDMA-based, wireless network for communication which are simple, cost-effective and/or easy to implement in currently existing wireless networks.

In accordance with the invention the aforementioned objectives are accomplished by way of the features recited by the claims and further as disclosed by the description that follows.

According to the invention, a method for providing a random access channel in a, preferably OFDMA-based, wireless network for communication comprising the steps of
a) Defining at least one radio frame according to a frame structure of the, preferably OFDMA-based, wireless network for data transmission,
b) Providing at least one random access channel in the radio frame by at least one base station of the, preferably OFDMA-based, wireless network for random data transmission of at least one user equipment, c) Accessing the at least one random access channel by the at least one user equipment for random data transmission, and is characterized by the steps of d) Determining network information of the based wireless network including network user equipment related information of the at least one user equipment and e) Assigning the at least one random access channel according to the determined network information for random data transmission.

Further in accordance with the invention, a system for providing a random access channel in a, preferably OFDMA-based, wireless network for a communication comprising at least one base station assigned to at least one cell of the wireless network, at least one user equipment, located in at least one of the cells of the wireless network and wherein the at least one base station is formed such to provide at least one random access channel in a radio frame for data transmission of the at least one user equipment, and is characterized in that the at least one base station is formed such to determine network information of the wireless network including network user equipment related information of the at least one user equipment and to assign the at least one random access channel according to the determined network information for random data transmission.

According to the invention it has first recognized that determining network information of the wireless network including network user equipment related information and then assigning the at least one random access channel according the determined network information for data transmission provides one or more random access channels in the radio frame with a reduced overall collision probability between different machine type communication device transmissions: For example the number of random access channels provided by a base station is adapted according to the actual needs within the, preferably OFDMA-based, wireless network of machine type communication devices.

According to the invention it has further been first recognized, that assigning and providing at least one random access channel according to determined network information results in an effective use of, preferably OFDMA-based, wireless network infrastructure devices and resources in general providing a greater flexibility of the wireless network infrastructure devices.

Further features, advantages and preferred embodiments are recited in the claims and further described as follows.

According to a preferred embodiment a location and/or size of the at least random access channel within at least one radio frame is static. This provides an easy implementation, since only the number of random access channels provided within the at least one radio frame varies according to the determined network information. For example, if a number of requests for random access channels is increased to transmit data via random access channels the number of random access channels within the radio frame is also increased to cope with the higher number of requests for random access channels. However the size and/or the location of the random access channels provided by a base station are predetermined.

According to a further preferred embodiment a plurality of radio frames is defined wherein the location and/or size of the at least one random access channel varies between at least two different radio frames. By changing the location and/or the size of the at least one random access channel between for example two subsequent radio frames, the at least one random access channel within the radio frame is provided in a very flexible way. For instance, if a machine type communication device requests a random access channel for transmitting a short message the size of a random access channel may be adapted in such a way that another machine type communication device may use a second random access channel within the radio frame for larger messages. This provides an even more effective use of the wireless network resources. Location and/or the size of the at least one random access channel within the at least one radio frame is in particular dependent on a frequency range and/or time interval of the wireless network. This enables an easy implementation of providing a random access channel in a wireless network for communication: The random access channel in an OFDMA wireless network may be defined by a certain OFDM-symbol number, representing a time and a certain subcarrier of the radio frame, representing a frequency and corresponding region extensions to define the time and/or frequency intervals.

According to a further preferred embodiment the network information include a network quality information, preferably path loss, quality of service, preferably maximum and/or average latency, and/or service availability related information. Based on an estimated or measured path loss a path loss measure, like CDF or the like, reflecting part of the spatial path loss distribution, the size and/or location or preferably further parameters of the at least one random access channel are determined and assigned to appropriate base stations, preferably a particular group of nodes satisfying a predefined path loss criterion. This implements an implicit power control and power grouping of base stations making sure that the base stations with a higher path loss have more resources available in form of random access channels and use a lower modulation and coding scheme (MCS) in order to ensure a successful data transmission via the at least one random access channel. In addition automatic repeat request probability and the corresponding automatic repeat request protocol are adapted respectively changed for these base stations satisfying the predetermined path loss criterion preferably in order to optimize a specific criterion such as energy consumption of the corresponding base station, or a success of a decoding process of transmitted data. Service availability related information include for example information for emergency services as well as a frequency with which user equipment may access the at least one random access channel.

According to a further preferred embodiment the network information include geographic, temporal and/or user equipment priority information. This enables a further optimization when providing a random access channel. For example if user equipment priority information is included an emergency signaling station may be provided with a random access channel immediately whereas for example a beverage vending machine has a lower user equipment priority and the data from the beverage vending machine like fill level or the like may only be transmitted if user equipment with higher priority do not use the at least one random access channel. Temporal network information may include information about time dependent traffic occurrence in the wireless network so that more random access channels may be provided and assigned if the overall network traffic is low. Geographic information may include the geographic position of the user equipment or of a machine type communication device. This information may for example be used to provide and assign a higher number of random access channels in geographical regions with a higher density of machine type communication devices. Such information enable an even more effective assigning and providing of the at least one random access channel in the radio frame of the, preferably OFDMA-based, wireless network.

According to a further preferred embodiment the network information includes commercial related information. Commercial related information may include a type of wireless provider contract, type and amount of payment for services and/or the importance of respective services and servers providing the services. The at least one random access channel preferably varying in size and/or location within a radio frame may be assigned and provided by a base station satisfying predefined commercial parameters.

According to a further preferred embodiment the location and/or size of the at least one random access channel is provided to the at least one user equipment by broadcasting or unicasting. Unicasting allows providing the information of the location and/or the size of the at least one random access channel individually for each user equipment. Broadcasting in contrast allows providing the at least one random access channel to a plurality of user equipment in an easy way.

According to a further preferred embodiment the at least one user equipment is assigned to the at least one random access channel according to the radio channel-specific gain of the at least one random access channel at the user equipment. This provides an easy and reliable adaption of user equipment to the characteristics of the wireless network connection between the base station and the user equipment. For example the transmitted power of the user equipment may be reduced according to the channel specific gains of the at least one random access channel. The gain in general corresponds to the reciprocal of the path loss and all other derived metrics, like signal strength, received power, signal-to-noise-radio, etc.

According to a further preferred embodiment the at least one base station obtains incrementally the channel-specific gains of a plurality of random access channels. When assigning a random access channel to the at least one user equipment the at least one base station may very easily obtain the channel-specific gain of the random access channel without any further actions to be performed by the at least one base station.

According to a further preferred embodiment assigning the at least one random access channel to the at least one user equipment for random data transmission includes a pre-defined assigning pattern, preferably including timing information and/or random access channel information. Such a predefined assigning pattern may indicate the at least one user equipment when to select which random access channel. The at least one user equipment may also access for example the at least one random access channel according to the predefined assigning pattern including timing information, preferably meaning that the at least one user equipment may access a certain random access channel at pregiven intervals. The predefined assigning pattern may also include random access channel information, i.e. that the choice of the random access channel by the at least one user equipment is performed according to the pre-defined assigning pattern, preferably a time-variant pattern.

According to a further preferred embodiment the same at least one random access channel is provided by a plurality of base stations wherein each base station is assigned to a cell of a cell-based wireless network. One advantage of providing the same at least one random access channel by a plurality of base stations is that user equipment is not restricted to a certain cell. When the user equipment is assigned to the at least one random access channel which is provided by different base stations this results in macro-diversity and avoidance of handover overhead for the user equipment when leaving a first cell and entering a second cell of a different base station. Further the user equipment does not need to decode cell-specific properties since it may simply use the same parameters for communication over multiple cells of the cell-based wireless network. For instance a random access channel provided over a plurality of cells may be used in vehicular machine to machine communication where the cells are aligned along a road sharing the same random access channel. If as an other example a group of user equipment subscribed to a particular service and accessible via a random access channel will be able to use this particular random access channel across different cells and therefore will not require and/or exchanging cell specific control information for accessing this particular random access channel. This means that a control overhead for establishing a data communication via a random access channel is reduced and macro-diversity is enhanced. This particular random access channel may be also accessed without using SIM data or the like.

According to a further preferred embodiment the at least one random access channel and the at least one base station is formed such to provide downlink data transmission from the at least one base station to at least one user equipment. If the at least one random access channel may also be accessed by at least one of the base stations multiple and/or adjacent base stations may access the same shared resources or resource units of the radio frame and therefore providing data transmission from the base station to the user equipment forming a "downlink random access channel". This allows a more flexible implementation of fractional frequency reuse and further reduces inter-cell coordination signaling in the wireless network.

According to a further preferred embodiment the at least one random access channel is assigned to an at least one user equipment group, comprising at least two user equipment, preferably located within a cell of a cell-based wireless network. This allows assigning a group of user equipment which may be defined by one or multiple parameters. Parameters may for example indicate beverage vending machines having the same supplier or the like. Such a so called "group shared random access channel" may then be used by the user equipment group comprising user equipment according to one ore more predefined parameters. This further provides an enhanced flexibility of providing and using random access channels within wireless networks.

According to a further preferred embodiment the at least one random access channel assigned to the at least user equipment group, is mapped onto a physical random access channel. This provides a grouping of user equipment without changing the structure of the physical level of the network providing an easy implementation in existing wireless networks.

BRIEF DESCRIPTION OF THE DRAWINGS

There are several ways how to design and further developed the teaching of the present invention in an advantageous way. To this end it is to be referred to the claims on the one hand and the following explanation of preferred embodiments of the invention by way of example illustrating by the drawing on the other hand. In connection with the explanation of the preferred example of an embodiment of the invention by the aid of the drawing, generally preferred embodiments and further developments of the teaching will be explained. In the drawings

DETAILED DESCRIPTION OF THE
PREFERRED EMBODIMENTS

Figure 1:
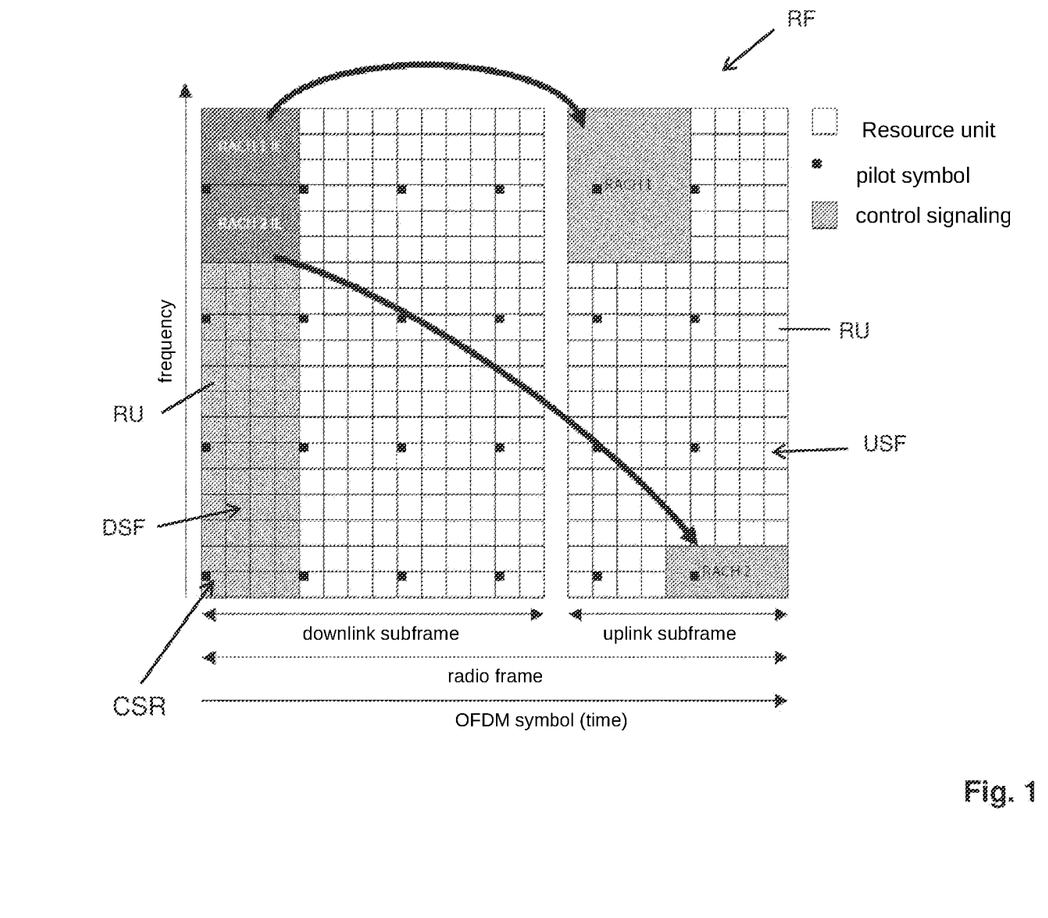
FIG. 1 shows a schematical view of an OFDMA radio frame and two random access channels within the OFDMA radio frame.

FIG. 1 shows a schematical view of an OFDMA radio frame and two random access channels within the OFDMA radio frame.

In FIG. 1 there is shown a configuration of two random access channels within a radio frame RF consisting of OFDMA symbols. Horizontally is shown the time axis whereas the vertical axis is the frequency axis. The shown radio frame RF is divided into a downlink subframe DSF on the left side and an uplink subframe USF on the right side. Each column in the radio frame RF represents an OFDM-symbol. The first four columns in time of the downlink subframe DSF represent a control signaling region CSR which specifies the location and size of a random access channel RACH1, RACH2 in the corresponding uplink subframe USF denoted by arrows in FIG. 1. In the control signaling region CSR are therefore random access channel information elements RACH1IE, RACH2IE included. These random access channel information elements RACH1IE, RACH2IE for example may include the address, the position and the size of the corresponding random access channel RACH1, RACH2 in the corresponding uplink subframe USF, denoted by arrows in FIG. 1. In FIG. 1 the first random access channel information element RACH1IE specifies the location of the first random access channel RACH1 in the uplink subframe USF in the upper left region with a size of five resource units RU in time and six resource units RU in frequency starting from the upper left corner of the uplink subframe USF. The second random access channel information element RACH2IE defines a random access channel RACH2 in the corresponding uplink subframe USF in the right lower corner of the uplink subframe USF with a size of five resource units RU in time and two resource units RU in frequency.

Figure 2:
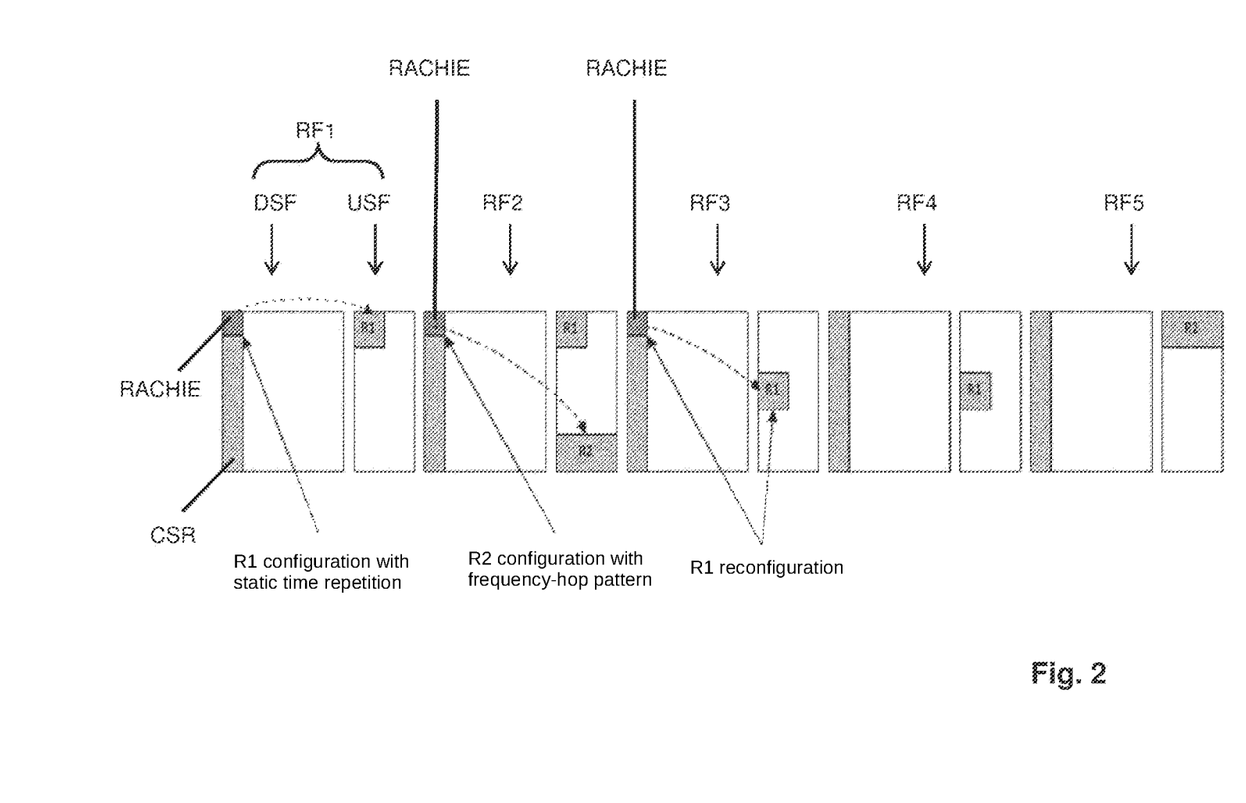
FIG. 2 shows a schematical view of a dynamic location of two random access channels within a plurality of OFDMA radio frames.

FIG. 2 shows a schematical view of a dynamic location of two random access channels within a plurality of OFDMA radio frames.

In FIG. 2 there are shown five radio frames RF1, RF2, RF3, RF4 and RF5. Each radio frame RF1-RF5 comprises a downlink subframe DSF and an uplink subframe USF. Each downlink subframe DSF comprises a control signaling region CSR wherein the control signaling region CSR comprises random access channel information elements RACHIE which specify the location and the size of a first and second random access channel R1, R2 in each uplink subframe USF.

In the first radio frame RF1 the random access channel information element RACHIE specifies the location of the first random access channel R1 in the uplink subframe USF of the first radio frame RF1 in the upper left corner. The random access channel information element RACHIE further includes the information that the first random access channel R1 is also static in time, meaning that the size and the location of the first random access channel R1 in following radio frame RF2 in the corresponding uplink subframe USF is static.

In the second radio frame RF2 the random access channel information element RACHIE in the control signaling region CSR is configured to specify the location and size of the second random access channel R2 with a dynamically changing location concerning the frequencies of the resource units RU of the second random access channel R2. In the second radio frame RF2 the first random access channel R1 has the same size and location as in the first radio frame RF1. The second random access channel R2 is located in the lower region of the uplink subframe USF with a size in time over the whole uplink subframe USF.

In the third radio frame RF3 the random access channel information element RACHIE is reconfigured and specifies now different random access channel positions for random access channels R1 and R2 with regard to the position in the uplink subframes USF of radio frames RF1 and RF2. For example in FIG. 2 in the third radio frame RF3, random access channel R1 has now a middle position with regard to the frequency axis of the radio frame RF3.

In the fourth radio frame RF4 the first random access channel R1 has the same size and position as in the third radio frame RF3. In the third and fourth radio frame RF3, RF4, the second random access channel R2 is not provided.

In the fifth radio frame RF5 there is shown no random access channel R1 but the second random access channel R2 is located at a different position compared to the position in the second radio frame RF2. In summary, the first random access channel R1 is therefore configured to follow a time-repetitive pattern in each radio frame RF1-RF4 at the same location in the radio frames RF1, RF2, respectively RF3 and RF4. The second random access channel R2 is configured to follow a frequency-hopping pattern appearing in every third radio frame RF2, RF5 and at a different position. Between the radio frames RF2 and RF3 the first random access channel R1 is reconfigured to a different frequency location.

Figure 3:
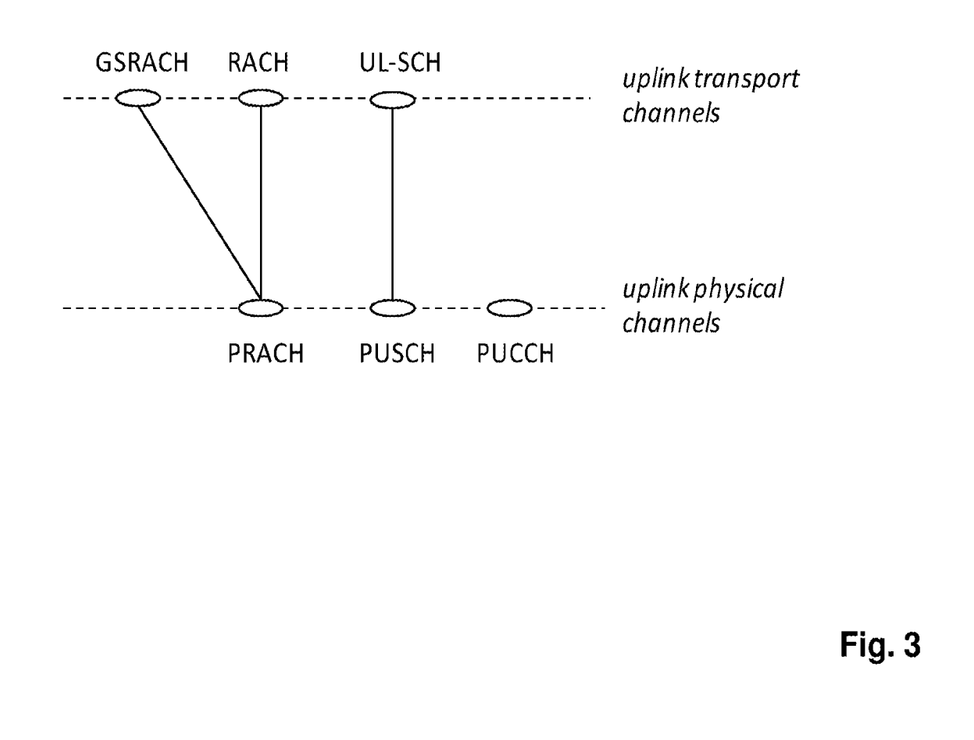
FIG. 3 shows a mapping of a group shared random access channel to a physical random access channel and FIG. 4 shows steps of the method in a first embodiment.

FIG. 3 shows a mapping of a group shared random access channel to a physical random access channel.

In FIG. 3 there a shown two levels of uplink channels comprising a lower uplink physical channel level and higher uplink transport channel level. In the uplink physical channel level there are shown a physical random access channel PRACH, a physical uplink shared channel PUSCH and a physical uplink control channel PUCCH sharing uplink control information. In the uplink transport channel level there are shown a group shared random access channel GSRACH, a random access channel RACH and an uplink shared channel UL-SCH. The group shared random access channel GSRACH is mapped to an instance of the physical random access channel PRACH. The random access channel RACH is also mapped to an instance of the physical random access channel PRACH. The uplink shared channel UL-SCH is mapped on the physical uplink shared channel PUSH.

A setup of a group shared random access channel GSRACH may be performed by the following steps: An evolved node B eNB decides according to measurement results, for instance a quality of service profile, a user equipment speed, etc. to create a group shared random access channel GSRACH in a first step. In a second step the evolved node B eNB unicasts a RadioResourceControl-ConnectionReconfiguration message to the selected number of user equipment. The RadioResourceControl-Connection- Reconfiguration message comprises the RadioResourceConfigDedicated information element which is modified to include the configuration of a dedicated physical random access channel PRACH (italicalized and underlined text indicates new entries):

```
-- ASN1START
PhysicalConfigDedicated ::= SEQUENCE {
pdsch-ConfigDedicated    PDSCH-ConfigDedicated   OPTIONAL,
    -- Need ON
pucch-ConfigDedicated    PUCCH-ConfigDedicated   OPTIONAL, --
Need ON
pusch-ConfigDedicated    PUSCH-ConfigDedicated   OPTIONAL, --
Need ON
uplinkPowerControl Dedicated UplinkPowerControlDedicated
OPTIONAL,
-- Need ON
tpc-PDCCH-ConfigPUCCH    TPC-PDCCH-Config   OPTIONAL,
-- Need ON
tpc-PDDCH-ConfigPUSCH    TPC-PDCCH-Config   OPTIONAL,
-- Need ON
cqi-ReportConfig         CQI-ReportConfig   OPTIONAL,
-- Need ON
soundingRS-UL-ConfigDedicated SoudingRS-UL-ConfigDedicated
OPTIONAL,
-- Need ON
antennaInfo              CHOICE {
    explicitValue        AntennaInfoDedicated,
defaultValue             NULL
}        OPTIONAL,                           --
Need ON
schedulingRequestConfig  SchedulingRequestConfig
OPTIONAL,
-- Need ON
...,
[[   cqi-ReportConfig-v920  CQI-ReportConfig-v920  OPTIONAL,
-- Need ON
antennaInfo-v920         AntennaInfoDedicated-v920
OPTIONAL
-- Need ON
]]
prach-ConfigDedicated    PRACH-ConfigDedicated   OPTIONAL  --
Need ON
}
-- ASN1STOP
```

A new information element PRACH-ConfigDedicated is defined:

```
-- ASN1START
PRACH-ConfigDedicated :: = SEQUENCE {
    prachConfig       PRACH-Config
}
-- ASN1STOP
```

The information element PRACH-config without the above mentioned modification is defined in the document 3GPP, "TS 36.331 V9.4.0 Radio Resource Control (RRC); Protocol specification" of September 2010.

Further all other possible and/or relevant parameters for providing a group shared random access channel GSRACH are or may be included in a respective information element in the RadioResource ConfigDedicated information element, for example: package data conversation protocol (PDCP), radio link control RLC and media access control related (MAC) parameters. To access the group shared random access channel GSRACH the selected user equipment use conventional mechanisms, preferably mentioned in 3GPP, "TS 36.331 V9.4.0 Radio Resource Control (RRC); Protocol specification" of September 2010 and/or 3GPP, "TS 36.321 V9.3.0 Medium Access Control (MAC); Protocol specification (Release 9)" of June 2010. However, only user equipment which is explicitly signaled is allowed to send preambles in the respective resource units RU in the uplink frame ULF.

Figure 4:
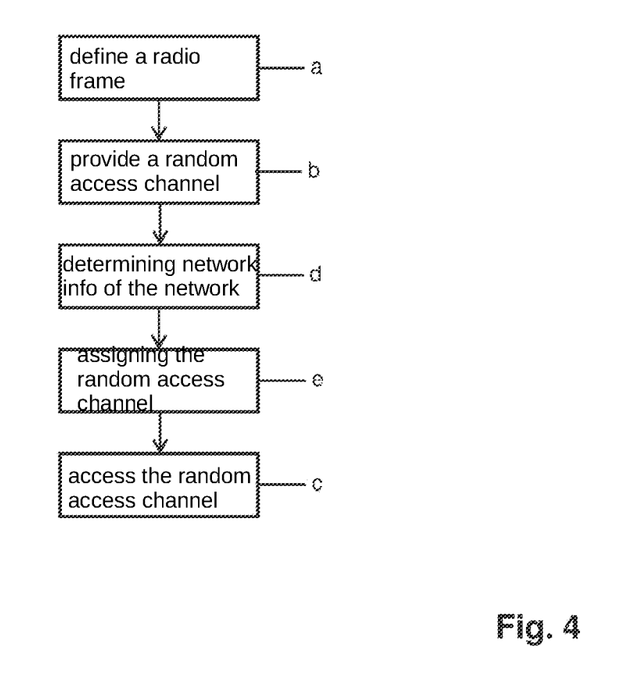

FIG. 4 shows steps of the method according to a first embodiment.

In FIG. 4 reference sign a denotes the step of

Defining at least one radio frame according to a frame structure of the, preferably OFDMA-based, wireless network for data transmission, reference sign b denotes Providing at least one random access channel in the radio frame by at least one base station of the, preferably OFDMA-based, wireless network for random data transmission of at least one user equipment, reference sign c denotes Accessing the at least one random access channel by the at least one user equipment for random data transmission, reference sign d denotes the step of Determining network information of the, preferably OFDMA-based, wireless network including network user equipment related information of the at least one user equipment and Reference sign e denotes the step of Assigning the at least one random access channel according to the determined network information for random data transmission.

Figure 5:
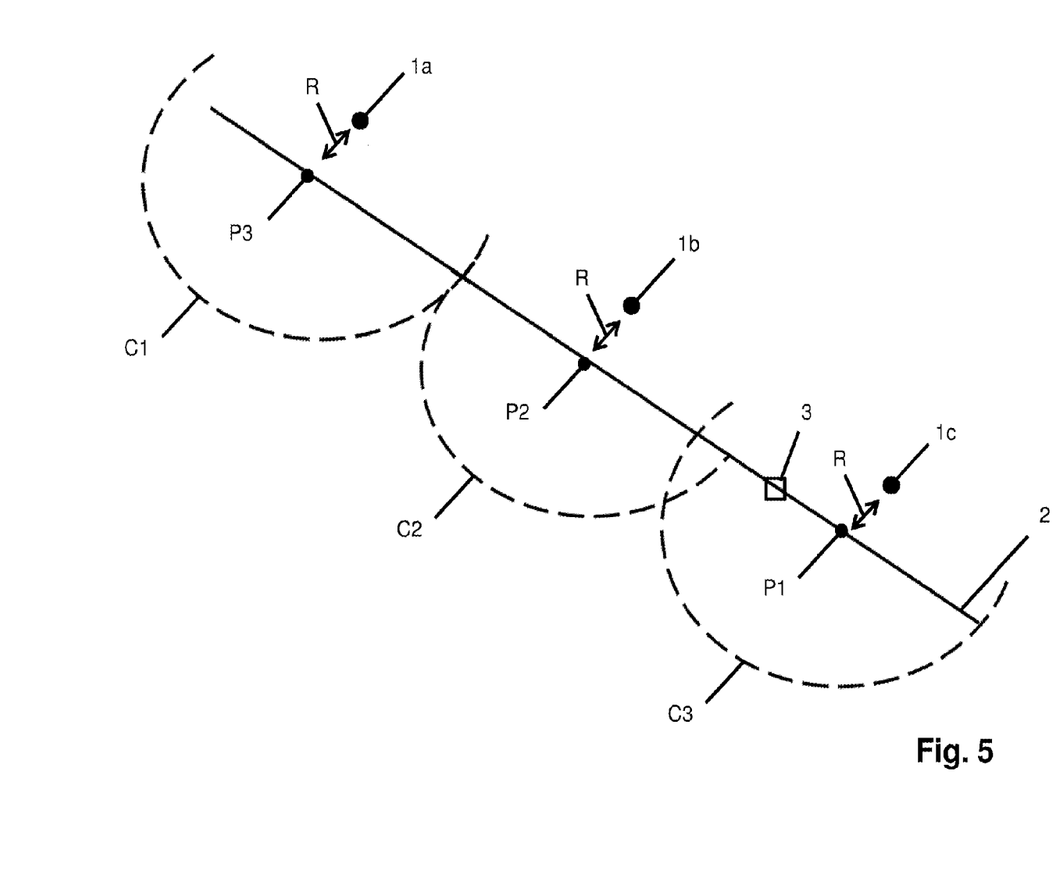
FIG. 5 shows a system according to the first embodiment of the present invention.

FIG. 5 shows a system according to the first embodiment of the present invention.

In FIG. 5 there are shown three base stations, 1a, 1b, 1c. Each base station 1a, 1b, 1c is assigned to a specific cell $C_1$, $C_2$, $C_3$ of an OFDMA-based wireless network. A user equipment moves along a line 2 through the cells $C_3$, $C_2$, $C_1$.

On the first position $P_1$ the user equipment requests a random access channel R within cell $C_3$ from the corresponding base station 1c. The random access channel R is then provided by the base station 1c. When crossing the border between the cell $C_3$ of base station 1c the user equipment enters into cell $C_2$ of base station 1b. The user equipment however is configured to the random access channel R of base station 1c. Base station 1b provides now the same random access channel R within cell $C_2$ for the user equipment for example at position $P_2$ so that a new handover is not necessary and the user equipment does not need to decode cell-specific properties and may use the same parameters over multiple cells $C_1$-$C_3$. Also when crossing the border between the cell $C_2$ of base station 1b to cell $C_1$ of base station 1a the random access channel R by base station 1a is the same as provided by the base stations 1b and 1c.

In summary the present invention provides an optimized method for providing a random access channels for machine-type communications. Another advantage is that a positioning of random access channels may be performed in frequency selective channels. A further advantage is that frequency selective channels gains may be obtained without any additional signaling or measurements by a base station of the, preferably OFDMA-based, wireless network. A further advantage is that the method and the system according the present invention provide a highly flexible access to random access channels. An even further advantage is that machine to machine devices have an optimized physical access to the random access channel. An even further advantage is that a time-variant and situation-dynamic optimization of random access in machine type communication is provided.

Further advantages are that a capacity for machine-type communication devices in coordinated, preferably OFDMA-based, wireless access system is increased. A further advantage is that energy consumption of machine-type communication devices can be reduced.

The method and the system according to the present invention is preferably applicable to OFDMA wireless access systems like 3GPP LTE or IEEE 802.16 family systems and preferably applicable in scenarios where high request rate for random access is expected like in machine to machines SmartMetering scenarios.

In summary a novel scheme for an optimized random access channel for machine type communication devices co-existing with regular mobile devices in a, preferably OFDMA, wireless network or system is provided. In particular, a scheduled random access channel is proposed, where the location and the number of the resource units can be modified according to the network scenario. Furthermore, the present invention exploits the fact that machine type communication devices are mostly static, such that the radio channel is frequency selective due to multipath propagation, but is also static in time due to the in this case negligible Doppler Effect.

A random access channel mechanism optimized for machine-type communication devices and traffic for, preferably OFDMA-based, wireless access systems with coordinated MAC, such as 3GPP LTE or the IEEE 802.16 family of standards is provided. The present invention proposes in particular to define multiple random access regions, which differ in location and size within the, preferably OFDMA, radio frame and have time-variant parameters. These parameters may depend on the actual scenario, channel characteristics, traffic load, deployment, application, and Quality of Service requirements. The position and the size of the random access channel can be signaled to the mobile terminals, either by broadcasting or by unicasting.

Many modifications and other embodiments of the invention set forth herein will come to mind the one skilled in the art to which the invention pertains having the benefit of the teachings presented in the foregoing description and the associated drawings. Therefore it is to be understood that the invention is not to be limited to the specific embodiments disclosed and that modifications and other embodiments are intended to be included within the scope of the appended claims. Although specific claims are employed herein, there are used in generic and descriptive sense only and not for purposes of limitation.

The invention claimed is:

1. A method for providing a random access channel in a wireless network for communication comprising the steps of:
   defining at least one radio frame (RF, RF1, RF2, RF3, RF4, RF5) according to a frame structure of the wireless network for data transmission;
   providing at least one random access channel (R1, R2, RACH1, RACH2) in the radio frame (RF, RF1, RF2, RF3, RF4, RF5) by at least one base station (1a, 1b, 1c) of the wireless network for random data transmission of at least one user equipment (3);
   accessing the at least one random access channel (R1, R2, RACH1, RACH2) by the at least one user equipment (3) for random data transmission;
   determining network information of the wireless network including network user equipment related information of the at least one user equipment (3); and
   assigning the at least one random access channel (R1, R2, RACH1, RACH2) according to the determined network information for random data transmission,
   wherein the at least one user equipment (3) is assigned to the at least one random access channel (R1, R2, RACH1, RACH2) according to the radio channel-specific gain of the at least one random access channel (R1, R2, RACH1, RACH2) at the user equipment.

2. The method according to claim 1, wherein at least one of a location and a size of the at least one random access channel (R1, R2, RACH1, RACH2) is static.

3. The method according to claim 2, wherein the location and/or size of the at least one random access channel (R1, R2, RACH1, RACH2) is provided to the at least one user equipment (3) by broadcasting or unicasting.

4. The method according to claim 2, characterized in that a plurality of radio frames (RF, RF1, RF2, RF3, RF4, RF5) are defined such that at least one of a location and a size of the at least one random access channel (R1, R2, RACH1, RACH2) varies between at least two different radio frames (RF, RF1, RF2, RF3, RF4, RF5) of said plurality of said radio frames.

5. The method according to claim 2, characterized in that the location and/or size of the at least one random access channel (R1, R2, RACH1, RACH2) within the at least one radio frame (RF, RF1, RF2, RF3, RF4, RF5) is dependent on a frequency range and/or time interval of the wireless network.

6. The method according to claim 1, wherein a plurality of said radio frames (RF, RF1, RF2, RF3, RF4, RF5) are defined such that at least one of a location and a size of the at least one random access channel (R1, R2, RACH1, RACH2) varies between at least two different radio frames (RF, RF1, RF2, RF3, RF4, RF5) of said plurality of said radio frames.

7. The method according to claim 1, wherein the location and/or size of the at least one random access channel (R1, R2, RACH1, RACH2) within the at least one radio frame (RF, RF1, RF2, RF3, RF4, RF5) is dependent on a frequency range and/or time interval of the wireless network.

8. The method according to claim 1, wherein the network information include network quality information.

9. The method according to claim 1, wherein the network information include geographic, temporal and/or user equipment priority information.

10. The method according to claim 1, wherein the network information includes commercial related information.

11. The method according to claim 1, wherein the at least one base station (1a, 1b, 1c) obtains incrementally the radio channel-specific gains of a plurality of random access channels (R1, R2, RACH1, RACH2).

12. The method according to claim 1, wherein assigning the at least one random access channel to the at least one user equipment (3) for random data transmission includes a pre-defined assigning pattern.

13. The method according to claim 1, wherein the same at least one random access channel (R1, R2, RACH1, RACH2) is provided by a plurality of base stations (1a, 1b, 1c) wherein each base station (1a, 1b,1c) is assigned to a cell (C1, C2, C3) of a cell-based wireless network.

14. The method according to claim 13, wherein the at least one random access channel (R1, R2, RACH1, RACH2) and the base station (1a, 1b, 1c) is formed such to provide at least one of downlink data transmission from the at least one base station (1a, 1b, 1c) to at least one user equipment (3).

15. The method according to claim 1, wherein the at least one random access channel (R1, R2, RACH1, RACH2) is assigned to an at least one user equipment group, comprising at least two user equipment.

16. The method according to claim 15, wherein the at least one random access channel (R1, R2, RACH1, RACH2) assigned to the at least one user equipment group, is mapped onto a physical random access channel (PRACH).

17. The method according to claim 15, wherein the at least two user equipment are located within a cell (C1, C2, C3) of a cell-based wireless network.

18. The according to claim 1, wherein the frame structure, the at least one base station, and the network information are OFDMA-based.

19. A system for providing a random access channel in a wireless network for communication, comprising:
   at least one base station (1a, 1b, 1c) assigned to at least one cell (C1, C2, C3) of the wireless network, and
   at least one user equipment (3), located in at least one of the cells (C1, C2, C3) of the wireless network,
   wherein the at least one base station (1a, 1b, 1c) is formed such to provide at least one random access channel (R1, R2, RACH1, RACH2) in a radio frame (RF, RF1, RF2, RF3, RF4, RF5) for data transmission of the at least one user equipment (3),
   wherein the at least one base station (1a, 1b, 1c) is formed such to determine network information of the wireless network including network user equipment related information of the at least one user equipment (3) and to assign the at least one random access channel (R1, R2, RACH1, RACH2) according to the determined network information for random data transmission, and
   wherein the at least one user equipment (3) is adapted to be assigned to the at least one random access channel (R1, R2, RACH1, RACH2) according to the radio-channel specific gain of the at least one random access channel (R1, R2, RACH1, RACH2) at the user equipment.

* * * * *